(12) United States Patent
Biehl et al.

(10) Patent No.: US 8,405,265 B2
(45) Date of Patent: Mar. 26, 2013

(54) ACTUATOR WITH INTEGRATED EQUIPMENT FOR CONDITION MONITORING AND METHOD FOR CONDITION MONITORING AND METHOD FOR PRODUCING AN ACTUATOR

(75) Inventors: Saskia Biehl, Braunschweig (DE); Timo Ruprecht, Braunschweig (DE)

(73) Assignees: Fraunhofer-Gesellschaft zur Foerderung der Angewandten Forschung E.V., Munich (DE); Deutsches Zentrum Fuer Luft-und Raumfahrt E.V., Cologne (DE)

( * ) Notice: Subject to any disclaimer, the term of this patent is extended or adjusted under 35 U.S.C. 154(b) by 311 days.

(21) Appl. No.: 12/876,285

(22) Filed: Sep. 7, 2010

(65) Prior Publication Data

US 2011/0057550 A1 Mar. 10, 2011

(30) Foreign Application Priority Data

Sep. 8, 2009 (DE) .......................... 10 2009 040 344

(51) Int. Cl.
*H02K 11/00* (2006.01)
(52) U.S. Cl. ........................................ 310/68 B; 310/90
(58) Field of Classification Search ................ 310/68 B, 310/90
See application file for complete search history.

(56) References Cited

U.S. PATENT DOCUMENTS

| 6,174,088 | B1 * | 1/2001 | Miyazaki ...................... 384/448 |
| 6,446,339 | B2 * | 9/2002 | Takamizawa et al. ...... 29/898.09 |
| 6,658,943 | B2 * | 12/2003 | McDearmon ..................... 73/795 |
| 7,971,490 | B2 * | 7/2011 | Fleury et al. .................... 73/781 |
| 7,976,223 | B2 * | 7/2011 | Kapaan ......................... 384/544 |
| 2007/0063620 | A1 * | 3/2007 | Kluft ............................. 310/338 |
| 2009/0121399 | A1 * | 5/2009 | Hindle et al. ............. 267/140.15 |

* cited by examiner

*Primary Examiner* — Thanh Lam
(74) *Attorney, Agent, or Firm* — Marshall & Melhorn, LLC

(57) ABSTRACT

This invention relates, in the field of aviation and vehicle technology, in particular in the field of control technology, to an actuator with integrated condition monitoring system for the detection and monitoring of mechanical irregularities of individual components of the actuator and/or for the measurement of a load distribution on the actuator. This invention further relates to a method for the monitoring the condition of the actuator and a method for its manufacture. The actuators claimed by the invention can be used in actuator systems in the field of aviation control and vehicle control technology as well as in the field of power generation.

23 Claims, 3 Drawing Sheets

ACTUATOR WITH INTEGRATED EQUIPMENT FOR CONDITION MONITORING AND METHOD FOR CONDITION MONITORING AND METHOD FOR PRODUCING AN ACTUATOR

This invention relates, in the field of aviation and vehicle technology, in particular in the area of control technology, to an actuator with an integrated condition monitoring system for the detection and monitoring of mechanical irregularities of individual components of the actuator and/or for the measurement of a load distribution on the actuator. The invention further relates to a method for the condition monitoring of the actuator and a method for its production. The actuators claimed by the invention are used in actuator systems in the field of aviation control and vehicle control technology as well as in the field of power generation.

In the field of aviation control systems for commercial aircraft, the use of electro-hydraulic actuators for the actuation of the control surfaces is still the state of the art. Because the design of these fluidic systems makes maintenance and repair time-consuming and expensive, they are a significant cost factor in aviation operations. Defects in these systems are also responsible for a significant proportion of unexpected delays.

Development in the sector of aviation control systems in particular and other aircraft and vehicle systems in general therefore focuses on the steadily increasing use of electrical and electro-mechanical systems. However, the electro-mechanical actuator systems that can be used in particular as a replacement for the electro-hydraulic actuators that are used have a significantly more complex construction. This complexity in turn leads to a greater susceptibility of the system to malfunctions. The effect of the malfunctions extends from a simple reduction of efficiency to irreversible instances of jamming.

Electro-mechanical actuators, for example, can be used as electro-mechanical systems, the behavior of which corresponds to that of an electro-hydraulic actuator. Electro-mechanical actuators of this type typically consist of an electric motor, the rotor of which drives the nuts of a circulating ball or planetary roller-type spindle actuator, which in turn converts the rotational motion of the motor into a translational movement of the spindle. Roller bearings of various types are used for the transmission of the forces introduced into the actuator. Roller bearings and spindles in particular, as load bearing elements, are the critical mechanical components of an electromechanical actuator.

Consequently, if one of the components of the electromechanical actuator is exhibiting an undetected error or malfunction, impulses and changes in the load distribution on the individual components can occur during operation. Further operation of the malfunctioning components can lead to an intensification of the effect of impulses or changes in the load distribution and ultimately to a failure of the electromechanical actuator.

Impulses can be detected with very good accuracy by means of a measurement of structure-borne noise performed by means of accelerometers, and the measurement can then be investigated by frequency analysis methods for the identification of characteristic patterns. However, on account of their great sensitivity these sensors are also susceptible to disturbance variables, of which there are a great many, especially when they are used in land vehicles or aircraft, and make it difficult to measure the relevant factors. In addition, these sensors cannot be used to perform a measurement of the load distribution on internal components.

The object of this invention is therefore to make available an actuator which solves the problems encountered with actuators of the prior art and is capable of detecting malfunctions that can lead to a critical system behavior at the earliest possible stage and to predict the remaining useful life of the actuator. Therefore the object of the invention is a method to monitor the condition of an actuator as well as a method for its production.

This object is accomplished by the actuator with an integrated condition monitoring system recited in claim 1 which utilizes the method for condition monitoring recited in claim 17, the method for the production of an actuator with integrated conditioning monitoring system recited in claim 22 and its use as recited in claim 23. Advantageous developments are described in the respective dependent claims.

The invention teaches an actuator which has an integrated monitoring system for the detection and monitoring of mechanical irregularities of individual components of the actuator and/or for the measurement of a load distribution on the actuator have at least two components that can move in relation to each other, each with a first and a second surface area as well as at least one piezoresistive sensor as an element of the condition monitoring system. The two components that can move in relation to each other are each arranged with their respective first surface areas in relation to each other so that the two first surface areas are in contact with each other at least in, certain areas and/or are separated from each other, either completely or at least in certain areas, by at least one additional component. At least the first or the second of the two components that can move in relation to each other have, in their second surface area, the at least one piezoresistive sensor, whereby this sensor, if it is located on the first component, is located in the load path of the first component, and if it is located on the second component, is located in the load path of the second component.

The load path means the route along which the force runs through the actuator. On account of the positioning of the at least one piezoresistive sensor in the load path, it becomes possible to measure the normal forces in the second surface area of the first and/or second component, which in turn makes it possible to derive conclusions relating to mechanical irregularities of individual components of the actuator and/or the measurement of a load distribution on the actuator.

The at least one piezoresistive sensor is therefore preferably located in the second surface area of the first or the second component and therefore lies in the load path of the first or the second component. The actuator can also have, on at least the first or the second component, more than one sensor, whereby the sensors are located in the load area in the second surface area of the first or the second component. Alternatively at least one sensor can also be located on the first and the second component, whereby the at least one sensor of the first component is in the second surface area of the first component and the at least one sensor of the second component is located in the second surface area of the second component.

Preferably at least one of the two components that are movable in relation to each other are in contact by means of parts of their second surface area with at least one additional element. The additional element is thereby preferably fixed in position with the first or the second component respectively. Between the first component and a first additional element and/or between the second component and a second additional element there is a contact area which preferably intersects at least partly the flux of force through the actuator. The piezoresistive sensor is therefore located at least partly in the contact area between the second surface area of one of the two components that are movable in relation to each other and is used for the measurement of normal forces in this area.

Generally, the at least one piezoresistive sensor can be positioned on the first and/or the second component, depending on the expected load cases, to integrate the sensitive areas for each loading direction of the actuator in the respective load path.

Impulses or a change in the load distribution can lead to a compression of the piezoresistive sensor between the respective first or second component and the additional element. The forces thereby transmitted to the piezoresistive sensor can be recorded as voltage signals that are proportional to the change in the resistance of the sensors. Defective components of an actuator can thereby be identified and observed. By means of the at least one sensor, the need for the repair or replacement of the actuator can be indicated early.

The actuator claimed by the invention can contain a movable component in the form of a roller bearing, for example. In that case, the first and second component of the actuator are an inner race and an outer race which can rotate in relation to each other. A roller bearing also contains, as at least one additional component of the actuator, a plurality of roll bodies which are located between the outside of the inner race and the inside of the outer race. Suitable roller bearings include, for example, planetary roller bearings, ball bearings or cone bearings. For example, the mechanical actuator can contain a spindle drive with an inner race in the form of a spindle and an outer race in the form of a spindle nut, which are separated from each other by roller bodies such as balls, for examples.

Alternatively the actuator can be an electro-mechanical actuator which, in contrast to the mechanical actuator which is in the form of a roller bearing, has an additional electric motor.

The actuator that contains a roller bearing can have a housing which encloses the outer race, as a result of which there is an area of contact between the housing and outer race which lies in the load path of the actuator. The actuator can also contain a drive shaft which performs the function of an inner race, or a transition to the drive shaft which is fastened to the inner race. Between the inner race and the transition to the drive shaft there is also an area of contact which is located at least in parts in the flux of force through the actuator.

The piezoresistive sensor is preferably located axially on at least one shoulder or an end face of the outer race, preferably partly or completely between the at least one shoulder and the housing. Alternatively or in addition, the sensor can also be located axially on the shoulder of the inner race, whereby it is preferably located in whole or in part between the inner race and the transition element to the drive shaft.

Alternatively or in addition the at least one sensor can also be located on the outside between the shoulder of the outer race between the housing and the outer race. In a corresponding manner, the sensor can be located on the inside between the shoulder of the inner race between the inner race and the transition to the drive shaft.

Preferably a plurality of sensors are located along the end face of the inner and/or of the outer race; which provide indications of the load distribution in the actuator. The piezoresistive sensors are thereby preferably located at regular intervals from one another.

In one particular embodiment, the inner race is realized in the form of a spindle and the outer race, which is provided with at least one piezoresistive sensor, forms a spindle nut with the roller bodies.

As a result of their design, piezoresistive sensors react with a change in the electrical resistance to the effect of external forces on one hand and to changes in temperature on the other hand. Because large variations in temperature occur in particular in the case of an application in the field of aircraft control systems, the actuator claimed by the invention preferably contains a temperature compensation element as a component of the condition monitoring system. The temperature compensation element is preferably located outside the load path next to the piezoresistive sensor. If the piezoresistive sensor is located on the first component, the temperature compensation element is preferably in the second area of the first component outside the load path. If, on the other hand, the sensor is attached to the second component, the temperature compensation element is located correspondingly in the second surface area of the second component. As a result of the temperature compensation it is possible to measure the forces that occur under constant conditions within the overall temperature range that occurs during typical flight missions.

For the instrumental measurement of the resistance, the at least one piezoresistive sensor is preferably fed by means a suitable constant voltage source. The at least one temperature compensation element is preferably connected in series with the at least one sensor. Alternatively, bridge circuits, in particular Wheatstone bridge circuits, or a parallel circuit can also be used for the connection of the temperature compensation element and of the sensor. For the actual determination of the measured values, a voltage signal that is proportional to the change in resistance of the sensors can be read by means of an additional circuit.

The actuator claimed by the invention can, for example, have a piezoresistive sensor which is in the form of at least one sensor point in a surface coating. Alternatively, the at least one piezoresistive sensor can be in the form of a coating which consists of a piezoresistive material or that contains a piezoresistive element.

The sensor point and/or the surface coating which consists of a piezoresistive material or contains a piezoresistive material can, for example, be a dosed or undosed hydrocarbon layer or a dosed or undosed amorphous hydrocarbon layer. In the case of a dosed hydrocarbon layer or a dosed hydrocarbon layer, appropriate materials that can be used for the dosing are tungsten, chromium, silver, titanium, gold or platinum.

The condition monitoring system of the actuator claimed by the invention preferably has electrodes which are located on the side of the sensor point and/or of the surface coating facing away from the second surface area of one of the components of the actuator. The electrodes can preferably be placed in contact with the at least one sensor point and/or the surface coating which consists of a piezoresistive material or contains a piezoresistive material, and can be connected with a voltage source, in particular with a constant voltage source or with a power source, in particular a constant current source. For the determination of the measured values, a voltage signal proportional to the change in resistance of the sensors is read by means of an additional circuit. For that purpose, this circuit performs a corresponding conditioning of the analog voltage values as well as an analog-digital conversion, so that it can then evaluate them by means of suitable signal processing methods in a computer system. The necessary electronic voltage modules can thereby be directly integrated into an electronic control system of the actuator.

The electrodes are preferably in the form of a thin metal layer. Particularly suitable electrodes are those that are made of chromium, a chromium-nickel combination or titanium or contain at least one of these materials.

Preferably a sensor structure is formed by each two electrodes that are located next to each other on the surface coating that contains or consists of a piezoresistive material in the second surface area on one of the components of the actuator. In that case, a first electrode is used to measure the force and a second electrode is used for temperature compensation. The first electrode used to measure the force consists of a first area which is preferably oval, and a second area which is preferably square or rectangular, whereby the first area and the second area are connected with each other. The first area is used to measure the force and is located in the load path. The second area is used to make electrical contact and is located outside the load path.

The second electrode is installed outside the load path and is used simultaneously for the measurement as well as for making electrical contact. Preferably each two neighboring electrodes or individual sensor structures are located at regular intervals in the vicinity of the load path, to thereby obtain the load distribution by means of at least one of the two components of the actuator.

Preferably the sensor point or the surface coating and the electrodes are protected from environmental effects and from the other components by an insulation and/or anti-wear layer. The insulation and/or anti-wear coating is preferably formed from a layer of hydrocarbon dosed with silicon, silicon-oxygen, aluminum or an aluminum nitride or containing at least one of these materials.

The at least one piezoresistive sensor is connected by means of an electrical connection with an evaluation unit and an electronic sensor system. The electronic sensor system preferably also includes the type of connection of the sensors with one another and/or with the temperature compensation elements, for example in the form of a series circuit, a bridge circuit, in particular a Wheatstone bridge circuit or a parallel circuit. Because, on account of the principle of operation of the actuator and the typical malfunction characteristics, the voltage signals that are measured during the operation of the actuator are periodic signals, the data are evaluated primarily by suitable methods of frequency, time-frequency and/or scale-frequency analysis. Because certain classes of mechanical malfunctions can also lead to a variation of the load distribution on roller bearings, such a variation is also determined by suitable methods and evaluated. This analysis is possible by the simultaneous observation of all of the available piezoresistive sensors located on a component. The result of the signal processing is a set of specific signal characteristics that make possible a clear detection, localization and classification of any mechanical defects that occur. The individual algorithms of the signal processing methods described here are executed on a computer system which is preferably integrated directly into an electronic control system of the actuator. Corresponding interfaces can thereby make it possible to transmit the determined actuator status to the higher-level systems.

This invention further relates to a method for the detection and monitoring of mechanical irregularities of individual components of an actuator and/or for the measurement of a load distribution on an actuator. The actuator preferably contains two components, each with a respective first and second surface area, whereby the two components move in relation to each other and are each located with their first surface area in relation to each other so that the two first surface areas are at least partly in contact with each other and/or are separated by at least one additional component. During the relative movement of the two components, the normal forces acting on at least one of the components are measured. In particular the normal forces acting on at least one of the components are measured in the vicinity of the load path of the actuator.

After the measurement of the electrical signals, the measurements are evaluated, preferably by means of suitable signal processing methods, for example by means of frequency and/or time-frequency and/or scale-frequency analysis.

The two components of the actuator claimed by the invention and optionally the at least one additional component are preferably in the form of roller bearings with an outer race and an inner race as well as roll bodies, whereby preferably a spindle actuator is configured with an outer race and an inner race in the form of a spindle. Beginning with an actuator of this type which optionally has an electric motor, in the method claimed by the invention the normal forces that are exerted axially on the shoulders of the outer and/or inner race are measured there. In particular piezoresistive sensors are used for the measurement of the normal forces.

This invention further relates to a method for the production of an actuator with an integrated condition monitoring system for the detection and monitoring of mechanical irregularities of the actuator and/or for the measurement of a load distribution on this actuator. The actuator has at least two components that move in relation to each other, each of which has a first and a second surface area. First a piezoresistive sensor is located on at least one of the two components, in particular in the second surface area. Then the two components are arranged in relation to each other so that they are in contact with each other with their two first surface areas and/or are separated from each other by at least one additional component.

As the piezoresistive sensor, a piezoresistive sensor layer which consists of a dosed or undosed hydrocarbon layer or contains such a layer, for example, can be applied to at least one of the two components of the actuator. As the dosing materials, the hydrocarbon layer can contain, for example, tungsten, chromium or silver. After the application of the sensor layer on the at least one component of the actuator, preferably structured electrodes consisting of a thin metal layer, such as chromium for example, are deposited on the sensor layer. Finally, an insulation and/or anti-wear layer such as a silicon-dosed hydrocarbon layer, for example, can be applied to the sensor layer and the electrodes.

The actuator claimed by the invention with an integrated condition monitoring system as well as the method for the detection and/or monitoring of mechanical irregularities of an actuator and for the measurement of a load distribution on an actuator are preferably used in control and/or actuator systems of vehicles, in particular aircraft. For example, the actuator claimed by the invention and the method claimed by the invention can be used for the control of ailerons, rudders, elevators, high-lift systems, spoilers, landing gear, door openers, cargo bays, variable sweep wings, canards and for cyclical or collective pitch control mechanisms on helicopters Alternatively, the actuator claimed by the invention and the method claimed by the invention can also be used in the field of power generation, for example also in pitch control mechanisms of wind power plants or the positioning of solar panels.

The invention is explained in greater detail below on the basis of the exemplary embodiment illustrated in the accompanying figures, although the invention is by no means limited to the specific exemplary embodiments illustrated here. In the drawing.

Figure 1:
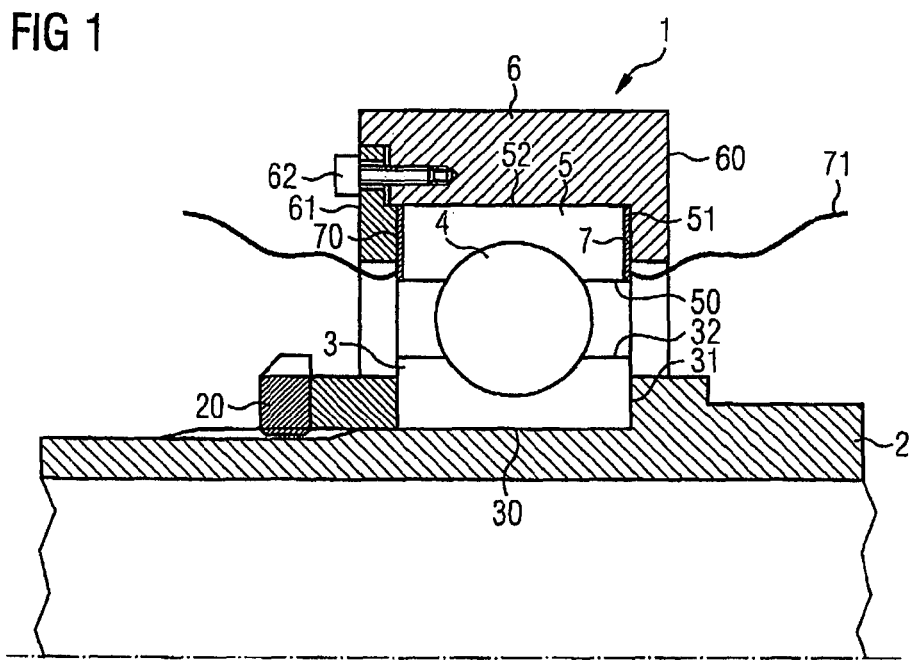
FIG. 1 is a detail of a roller bearing in cross section.

FIG. 1 shows a detail of a cross section of a roller bearing 1. An inner race 3 is affixed to a drive shaft 2. The inner race 3 has an inside 30 that faces the drive shaft 2, two end faces or shoulders 31 and an outside 32 that faces away from the drive shaft 2 and faces a roll body 4, whereby the outside 32 has a recess for the roller body 4. The inner race 3 is braced between an undercut of the drive shaft 2 and a clamp bolt 20 and is fixed in position with respect to the drive shaft 2.

The inner race 3 and the roll bodies 4 are surrounded by an outer race 5, whereby the outer race 5 is fixed in position with respect to a housing 6. The outer race has an inside 50 that faces the roll body 4 and the inner race 3 with a recess for the roller body 4. The inside of the outer race 5 corresponds to a first area of the outer race 5. The outer race 5 also has two end faces 51 and a side 52 that faces away from the roller body 4. The end faces or shoulders 51 and the outside 52 of the outer race 5 form the second area of the outer race 5.

The outer race 5 is clamped in areas with its end faces 51 between a main part 60 and a movable clamping part 61 of the housing 6. The clamping part 61 is screwed down by means of a screw 62 so that the end faces 51 of the outer race are clamped. The outer race 51 has on its shoulders a piezoresistive sensor 7 which is in the form of a sensor layer which is located partly in the contact area between the end faces 51 of the outer race 5 and the main housing part 60 as well as the housing clamping part 61. A portion of the sensor layer is located on an unclamped area of the end face. The sensor layer 7 is connected by means of an electrical line 71 with an evaluation unit (not shown).

Figure 2:
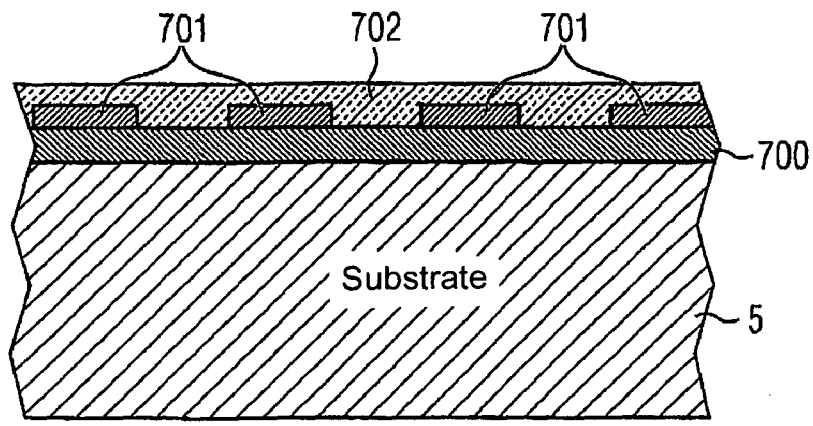
FIG. 2 shows the layer structure of a sensor structure.

FIG. 2 shows the sensor layer 7 which is deposited on a substrate such as an outer race 5, for example. The sensor layer 7 has a piezoresistive sensor layer 700. The sensor layer 700 is either a pure carbon layer or a carbon layer which is dosed with a metal such as tungsten, chromium or silver, for example. Structured electrodes 701 are located on the piezoresistive sensor layer 700 for force measurement and temperature compensation and to make electrical contact. The electrodes 701 are in the form of a thin metal layer made of chromium. A silicon-dosed hydrocarbon layer 702 is deposited as insulation and anti-wear protection on the piezoresistive sensor layer 700. In this layered structure 7 all the sensor points have the same mass.

Figure 3:
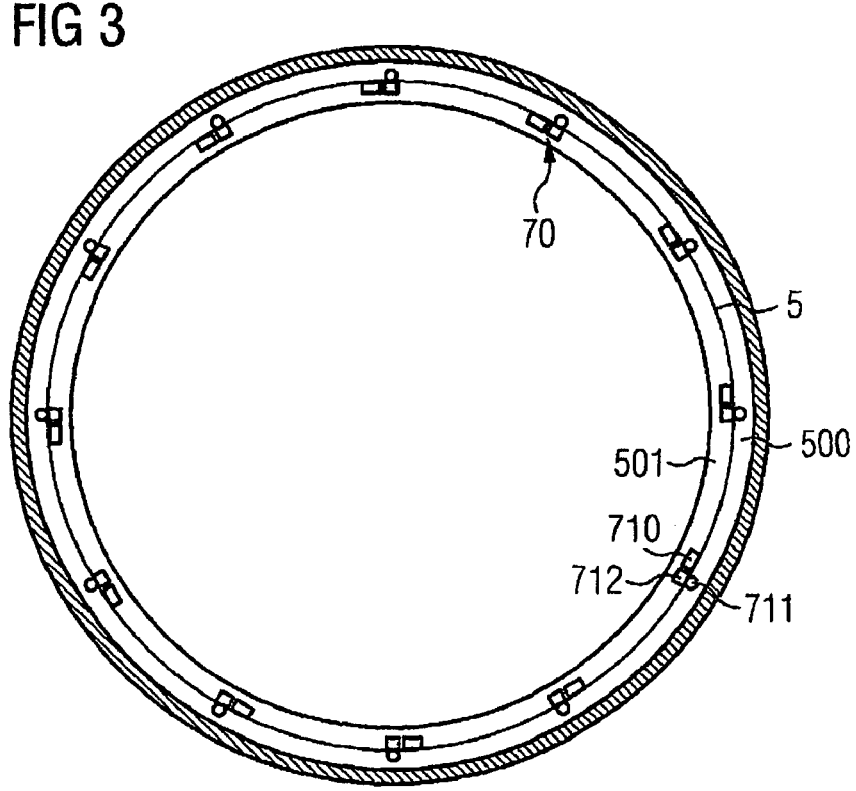
FIG. 3 shows an outer race with piezoresistive sensors and temperature compensation elements.

FIG. 3 shows an outer race which has sensor structures 70 at regular intervals. The sensor structures 70 are constructed as structural pairs of a rectangle 710 and a combined structure 711, 712. The rectangle 710 lies outside the load area 500 and is used for temperature compensation. Of the combined structure, the round area 711 is in a frictional connection, i.e. in the load area 500, while the rectangular area 712 is used for making electrical contact. The two structures, i.e. the rectangle 710 for temperature compensation and the combined structure 711, 712, are connected with each other in series. This type of connection has the advantage that, this system represents an ideal voltage divider regardless of the temperature. By means of such an arrangement of the sensor structures 70, the load distribution can be measured by means of the bearing race 5.

Figure 4:
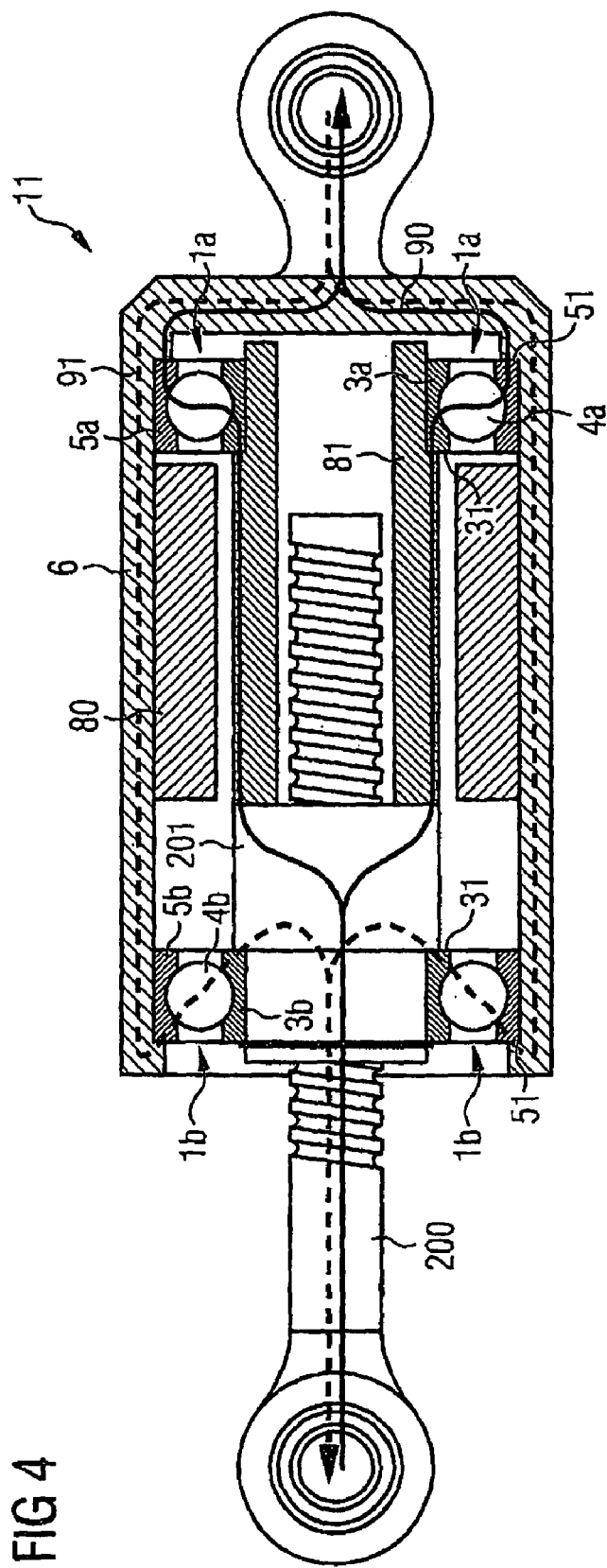
FIG. 4 is a cross section through a single thread with an illustration of the flux of force.

FIG. 4 shows a detail of an electric motor 11. This motor has a spindle 200 and a spindle actuator 201. The spindle actuator 201 is connected on its first end with a rotor 81 which is fixed in position with an inner race 3a of a first bearing 1a. On its second end, the screw actuator 201 is fixed in position with an inner race 3b of a second bearing 1b. Held at some distance from the inner race 3a by a roll body 4a is an outer race 5a which is fixed in position with respect to a housing 6. Accordingly, an outer race 5b of the second bearing 1b is separated from the inner race 3b and is fixed in position relative to the housing 6 by the roll body 4b. The housing 6 is connected with a stator 80 so that the housing 6 is always stationary.

Piezoresistive sensor layers are located on the end faces 31 and 51 of the inner races 3a, 3b and of the outer races 5a, 5b of the first and second bearing 1a, 1b.

If the rotor 81 is then rotated in an appropriate direction by an external alternating magnetic field or a corresponding reversal of polarity of the stator 80, the spindle actuator 201 moves the spindle 200, which is fastened so that it does not turn around its own axis, out of the housing. If the rotor is rotated in the opposite direction, the rotation of the spindle actuator 201 effects a movement of the spindle 200 toward the housing 6.

Regardless of the direction of movement of the spindle, both tractive and compressive forces can be introduced into the actuator via the spindle. A compressive force is thereby oriented so that its direction of action points along the spindle toward the housing 6. The resulting flux of force through the motor 11 is identified by reference number 90. On the other hand, the line of action of a tractive force points along the spindle away from the housing. The flux of force that corresponds to this load case through the motor 11 is identified by the reference number 91.

Regardless of the respective combination of load case and direction of movement that can occur during the operation of the actuator, it is important that the bearings 1a, 1b are not defective, to guarantee a low-friction operation. The invention teaches that the functionality of the bearings is checked by the use of piezoresistive sensors.

The piezoresistive force sensors used here must make possible a measurement of the load distribution on the roller bearings installed in the actuator, as well as the measurement of the pulses generated by defects in bearings or the spindle. For this purpose, they are integrated directly into the load path of the actuator and thus make possible a measurement which is very much closer to the affected components than is possible by means of a measurement of structure-borne noise. As a result of the location directly in the load path, the effects of defects and damage on both the bearings and the spindles can be detected.

The invention claimed is:

1. Actuator with integrated condition monitoring system for the detection and monitoring of mechanical irregularities of individual components of the actuator and/or for the measurement of a load distribution on the actuator, whereby the actuator contains at least two components that are movable in relation to each other, each with a first and a second surface area, whereby the two components are oriented with their respective first surface areas in relation to each other so that the two first surface areas are in contact with each other and/or are separated from each other by at least one additional component, characterized in that the second surface area of at least one of the two components has at least one piezoresistive sensor as an element of the condition monitoring system, whereby the at least one piezoresistive sensor is located in the load path of at least one of the two components.

2. Actuator as recited in claim 1, characterized in that the actuator has two or more piezoresistive sensors.

3. Actuator as recited in claim 1, characterized in that the second surface area of at least one of the two components is in contact at least in areas with at least one additional element, whereby the piezoresistive sensor is located at least partly in the area of contact between the second surface area and the additional element.

4. Actuator as recited in claim 1, characterized in that the at least two components are an inner race and an outer race of a roller bearing which are rotational with respect to each other and the at least one additional component of the actuator is a plurality of roll bodies which are located between the inner race and the outer race.

5. Actuator as recited in claim 4, characterized in that the piezoresistive sensor is located axially on at least one of the shoulders of the outer race, in particular completely or partly between at least one of the shoulders and a housing and/or axially on at least one of the shoulders of the inner race, in particular completely or partly between at least one of the shoulders of the inner race and a drive shaft or a transitional element to the drive shaft.

6. Actuator as recited in claim 4, characterized in that at least one of the shoulders of the outer race and/or of the inner race advantageously have piezoresistive sensors along the peripheral direction of the outer race and/or of the inner races, which sensors are advantageously located at regular intervals.

7. Actuator as recited in claim 4, characterized in that the inner race is in the form of a spindle and the outer race forms a spindle nut with the piezoresistive sensor.

8. Actuator as recited in claim 1, characterized in that the condition monitoring system contains at least one temperature compensation element which is located in particular outside the load path, preferably in the second surface area of at least one of the components of the actuator, preferably in the vicinity of the piezoresistive sensor or next to it.

9. Actuator as recited in claim 1, characterized in that the at least one piezoresistive sensor and the at least one temperature compensation element are connected so that they form a series circuit or a bridge circuit, in particular a Wheatstone bridge circuit.

10. Actuator as recited in claim 1, characterized in that
the at least one piezoresistive sensor is in the form of at least one sensor point in a surface coating, or
that the at least one piezoresistive sensor is a surface coating which consists of a piezoresistive material or contains such a material.

11. Actuator as recited in claim 10, characterized in that the sensor point and/or the surface coating which consists of a piezoresistive material or contains a piezoresistive material is a dosed or undosed hydrocarbon layer, which is optionally dosed with tungsten, chromium, silver, titanium, gold or platinum.

12. Actuator as recited in claim 10, characterized in that the piezoresistive sensor, in particular on the side of the sensor point and/or of the surface coating facing away from the second surface area of one of the components of the actuator, has electrodes, with which the at least one sensor point and/or the surface coating, which consists of a piezoresistive material or contains a piezoresistive material, can be placed in contact and can be connected with a voltage source, in particular a constant voltage source, or with a voltage source, in particular a constant voltage source.

13. Actuator as recited in claim 12, characterized in that the electrodes are in the form of a thin metal layer which consists preferably of chromium, chromium-nickel compounds or titanium or contains at least one of these materials.

14. Actuator as recited in claim 12, characterized in that two electrodes are always located next to one another, whereby a first electrode which has a first area for force measurement and a second area for electrical bonding is located with the first area in the load path and with the second area outside the load path, and a second electrode for temperature compensation is located outside the load path.

15. Actuator as recited in claim 1, characterized in that an insulation and/or anti-wear layer is deposited in partial areas on the side of the sensor point that faces away from the components of the actuator and/or on the surface coating and on the electrodes located on it, whereby the insulation and/or anti-wear layer preferably consists of a hydrocarbon layer dosed with silicon, silicon-oxygen, aluminum or aluminum nitride, or contains a hydrocarbon layer dosed with silicon, silicon-oxygen, aluminum or aluminum nitride.

16. Actuator as recited in claim 1, characterized in that the at least one piezoresistive sensor is connected by means of an electrical connection with an evaluation unit and an electronic sensor system.

17. Method for the detection and monitoring of mechanical irregularities of individual components of an actuator and/or for the measurement of a load distribution on them, whereby the actuator contains at least two components, each with a first and a second surface area, whereby the two components move relative to each other and are each located with their first surface area with respect to each other so that the two first surface areas are in contact with each other at least in places and/or are separated from each other by at least one additional component,
characterized in that
the normal forces acting on at least one of the components during the relative movement of the two components are measured.

18. Method as recited in claim 17, characterized in that the normal forces in the vicinity of the load path on at least one of the components are measured.

19. Method as recited in claim 17, characterized in that the values measured are evaluated by means of suitable signal processing methods, in particular by means of frequency and/or time-frequency and/or scale-frequency analysis.

20. Method as recited in claim 17, characterized in that the two components of the actuator and optionally the at least one additional component form a roller bearing with an outer race and an inner race and roll bodies, preferably a spindle actuator with an outer race and an inner race in the form of a spindle, and the normal forces acting axially on the shoulders of the outer race and/or the inner race are measured.

21. Method as recited in claim 17, characterized in that the normal forces are measured by means of a piezoresistive sensor.

22. Method for the production of an actuator with integrated condition monitoring system for the detection and monitoring of mechanical irregularities of the actuator and for the measurement of a load distribution on the actuator, whereby the actuator contains at least two components that can move in relation to each other, each with a first and a second surface area, whereby the two components are arranged in relation to each other with their first surface area so that the two first surface areas are in contact with each other and/or are separated from each other by means of at least one additional component,
characterized in that
a piezoresistive sensor is attached to at least one of the two components in its second surface area.

23. Use of an actuator with integrated condition monitoring system as recited in claim 1 in a method for the detection and monitoring of mechanical irregularities of an actuator and for the measurement of a load distribution on an actuator in control and actuator systems in aircraft control systems, in the field of vehicle control and/or in the field of power generation, whereby the actuator contains at least two components, each with a first and a second surface area, whereby the two components move relative to each other and are each located with their first surface area with respect to each other so that the two first surface areas are in contact with each other at least in places and/or are separated from each other by at least one additional component, characterized in that the normal forces acting on at least one of the components during the relative movement of the two components are measured.

* * * * *